US007326924B2

(12) United States Patent
Ding et al.

(10) Patent No.: US 7,326,924 B2
(45) Date of Patent: Feb. 5, 2008

(54) METHOD FOR OBTAINING HIGH ACCURACY MASS SPECTRA USING AN ION TRAP MASS ANALYSER AND A METHOD FOR DETERMINING AND/OR REDUCING CHEMICAL SHIFT IN MASS ANALYSIS USING AN ION TRAP MASS ANALYSER

(75) Inventors: Li Ding, Sale (GB); Francesco Lorenzo Brancia, Manchester (GB)

(73) Assignee: Shimadzu Research Laboratory (Europe) Ltd, Manchester (GB)

( * ) Notice: Subject to any disclaimer, the term of this patent is extended or adjusted under 35 U.S.C. 154(b) by 0 days.

(21) Appl. No.: 10/558,474

(22) PCT Filed: Jun. 2, 2004

(86) PCT No.: PCT/GB2004/002337

§ 371 (c)(1),
(2), (4) Date: Nov. 2, 2006

(87) PCT Pub. No.: WO2004/109743

PCT Pub. Date: Dec. 16, 2004

(65) Prior Publication Data

US 2007/0075239 A1 Apr. 5, 2007

(30) Foreign Application Priority Data

Jun. 5, 2003 (GB) ................................ 0312940.0

(51) Int. Cl.
*H01J 49/42* (2006.01)
*H01J 49/00* (2006.01)
*B01D 59/44* (2006.01)

(52) U.S. Cl. ...................... 250/282; 250/281; 250/290; 250/293

(58) Field of Classification Search ................ 250/282, 250/290
See application file for complete search history.

(56) References Cited

U.S. PATENT DOCUMENTS 4,540,884 A 9/1985 Stafford et al.

(Continued)

FOREIGN PATENT DOCUMENTS

EP 0 701 471 B 4/1999

(Continued)

OTHER PUBLICATIONS

Jonscher et al., "Ion Trap Mass Spectrometry", <http://www.abrf.org/ABRFNews/1996/September1996/sep1996/sep96iontrap.html>.*

(Continued)

*Primary Examiner*—David Vanore
*Assistant Examiner*—Bernard Souw
(74) *Attorney, Agent, or Firm*—Stites & Harbison PLLC; Douglas E. Jackson

(57) ABSTRACT

A method for obtaining high accuracy mass spectra using an ion trap mass analyzer includes adjusting operating parameters of the analyser to enable a reverse mass scan in a mass selective resonance ejection mode and setting the trapping field to trap ions in a mass-to-charge ratio which has a lower limit close to the mass-to-charge ratio of an ion of interest. A method of determining chemical shift includes adjusting operating parameters of the analyzer to enable forward and reverse mass scans and calibrating the spectra obtained from the forward and reverse mass scans.

16 Claims, 8 Drawing Sheets

U.S. PATENT DOCUMENTS

Figure 1:
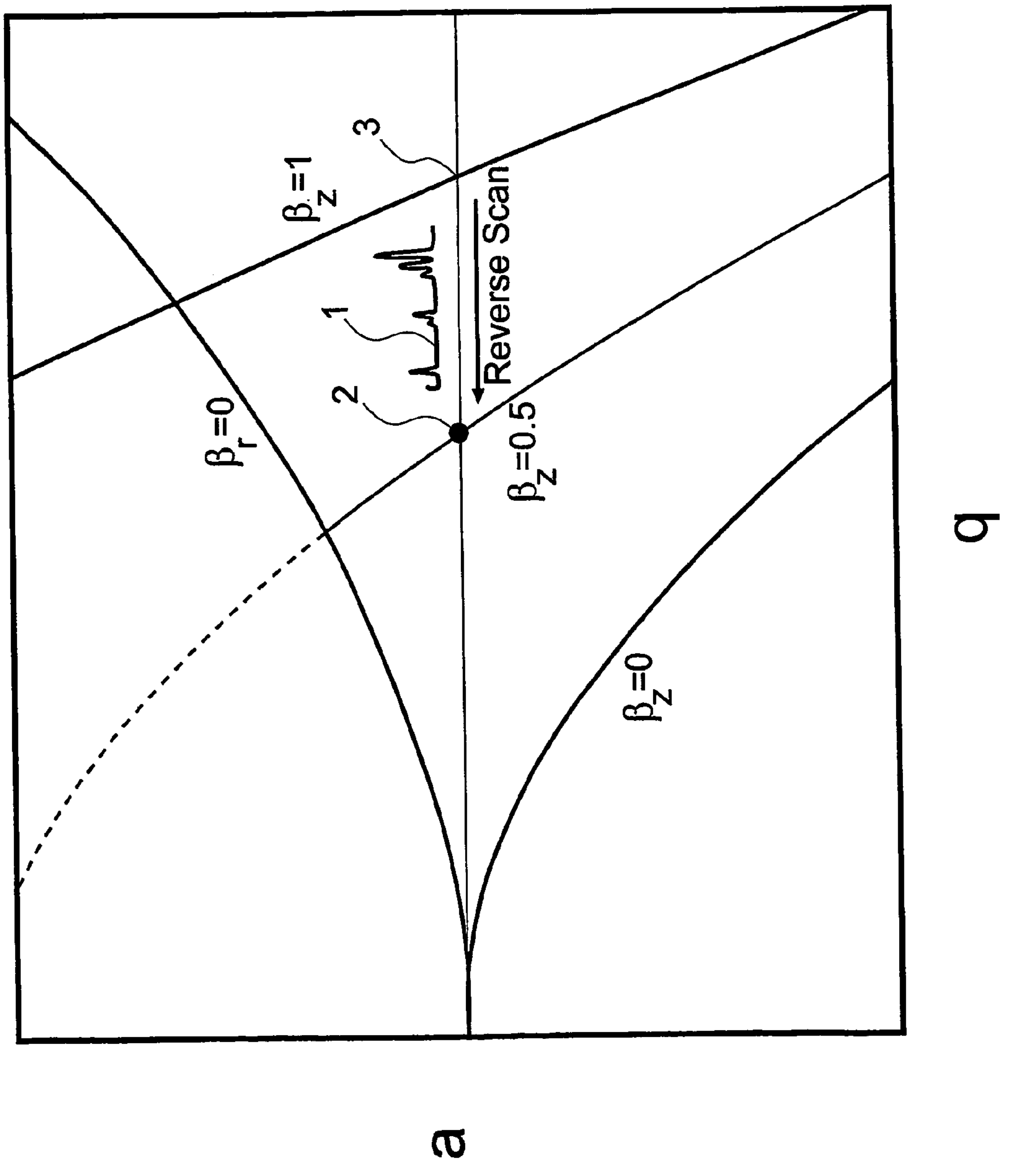

| | | | | |
|---|---|---|---|---|
| 4,736,101 | A | 4/1988 | Syka et al. | |
| 4,749,860 | A | 6/1988 | Kelley et al. | |
| 4,771,172 | A | 9/1988 | Weber-Grabau et al. | |
| 4,882,484 | A | 11/1989 | Franzen et al. | |
| 5,198,665 | A * | 3/1993 | Wells | 250/282 |
| 5,623,144 | A * | 4/1997 | Yoshinari et al. | 250/281 |
| 5,714,755 | A * | 2/1998 | Wells et al. | 250/281 |
| 6,181,474 | B1 * | 1/2001 | Ouderkirk et al. | 359/629 |
| 6,489,610 | B1 * | 12/2002 | Barofsky et al. | 250/287 |
| 6,559,443 | B2 * | 5/2003 | Shiokawa et al. | 250/288 |
| 6,972,408 | B1 * | 12/2005 | Reilly | 250/292 |
| 7,064,319 | B2 * | 6/2006 | Hashimoto et al. | 250/287 |
| 7,078,686 | B2 * | 7/2006 | Roushall et al. | 250/292 |
| 7,199,362 | B2 * | 4/2007 | Rockwood et al. | 250/286 |
| 2003/0132377 | A1 * | 7/2003 | Bateman et al. | 250/281 |
| 2004/0061049 | A1 * | 4/2004 | Curry et al. | 250/282 |
| 2004/0126267 | A1 * | 7/2004 | DiSalvo et al. | 420/466 |
| 2005/0061966 | A1 * | 3/2005 | Ding et al. | 250/288 |
| 2006/0038123 | A1 * | 2/2006 | Quarmby et al. | 250/292 |
| 2007/0023629 | A1 * | 2/2007 | Makarov | 250/282 |
| 2007/0034810 | A1 * | 2/2007 | Hoyes | 250/396 R |
| 2007/0075239 | A1 * | 4/2007 | Ding et al. | 250/282 |
| 2007/0164208 | A1 * | 7/2007 | Quarmby et al. | 250/282 |

FOREIGN PATENT DOCUMENTS

| | | | | |
|---|---|---|---|---|
| EP | 0 579 935 | B | | 7/1999 |
| EP | 0579935 | B | * | 7/1999 |
| WO | WO 0129875 | | | 4/2001 |
| WO | PCT/GB02/04807 | | | 1/2002 |

OTHER PUBLICATIONS

Ding, L. et al., “A simulation study of the digital ion trap mass spectrometer,” International Journal of Mass Spectrometry, Elsevier Science Publishers, Amsterdam, NL, vol. 221, No. 2, Nov. 15, 2002, pp. 128-130.

Cleven, C.D. et al., Rapid Communications in Mass Spectrometry, vol. 8, 451 (1994).

Wells, M. et al., Analytical Chemistry, vol. 72, No. 13, 2667.

* cited by examiner

METHOD FOR OBTAINING HIGH ACCURACY MASS SPECTRA USING AN ION TRAP MASS ANALYSER AND A METHOD FOR DETERMINING AND/OR REDUCING CHEMICAL SHIFT IN MASS ANALYSIS USING AN ION TRAP MASS ANALYSER

This invention relates to the operation of an ion trap mass analyser such as a quadrupole ion trap mass analyser.

Quadrupole ion trap mass analysers have been developed and used as mass spectrometers since the mass selective instability mode was invented several decades ago (U.S. Pat. No. 4,540,884). Later, in a series of US patents, such as U.S. Pat. Nos. 4,736,101, 4,749,860, 4,882,484, a whole set of MS and MS/MS methods using resonance ejection of ions from the ion trap was disclosed. Based on these methods the commercial ion trap mass spectrometer instruments were manufactured and widely used. The principle of operation of these instruments can be summarized as follows: A) Ions within a predefined mass range are trapped by applying a trapping RF voltage to the ion trap; B) Application of a supplementary AC voltage between two end cap electrodes causes resonance ejection of unwanted ions; C) Application of a supplementary AC voltage for activating the remaining precursor ions induces collisional dissociation generating product ions; and finally, D) Parameters of the trapping RF or supplementary AC voltage are scanned in order to resonantly eject ions according to their mass to charge ratio, thus E) A mass spectrum can be obtained by measuring the ejected ions.

It is commonly accepted that the mass measurement accuracy of an ion trap mass spectrometer is inferior compared with that obtained using other modern mass analyzers. This can be attributable to two factors: a) the influence of space charge induced by the trapped ions and b) the so called chemical shift due to physical-chemical properties of the ions.

The space charge effect occurs when the ion trap is filled with a large number of ions. The increase ion density results in a mass displacement due to ion/ion repulsions. This phenomenon has been studied by C. D. Cleven, K. A. Cox and R. G. Cooks and published in Rapid Communications in Mass Spectrometry Vol.8 451 (1994). Alteration of the ion motion during resonant ejection reflects the modification of the shape of the trapping potential due to space charge effects. The larger the number of ions and the larger the charge on each ion, the larger is the shift of the frequency of ion oscillation which, in turn, affects the resonant ejection time. This is responsible for the mass shift detected in the mass spectrum. Furthermore, the smaller the difference in mass-to-charge ratio between two ion species under excitation, the higher the influence that these ions will play on each other. When organic molecules are analyzed, their isotopic envelope contain the monoisotopic ion ($^{12}C$ containing molecule) followed by a number of heavier isotopic ions arising from the combinations of $^{12}C$ and $^{13}C$ atoms in the molecule. Due to its certainty, mass assignment of an ion species relies commonly on the labelling monoisotopic ion within the isotopic cluster. However in the mass selective ejection mode, when the ion trap carries out a forward mass scan, the ejection of the monoisotopic ion is affected by the co-presence of the other isotopic ions which are ejected later. The delay in ejection time influences both mass resolution and mass accuracy. In order to obtain accurate mass assignment, the number of ions has to be carefully controlled prior to scan.

U.S. Pat. No. 4,771,172 discloses a space charge control method where a prescan is performed in order to pre determine the necessary ionization time which will prevent space charge effects. However such a prescan may not reflect the exact ionization rate for the following scan. Too strict a control of ion space charge reduces the intensity of ion signal, especially when the intensity of the ion of interest is relatively small compared with other trapped species.

It can be envisaged that the mass shift may be minimized if the ejecting mass scan is carried out in order of decreasing mass to charge ratio (reverse scan). In this case all heavier isotopic ions within the isotopic cluster are removed before resonantly ejecting the monoisotopic ion. To maximize this procedure, it would be preferable to position the ion of interest close to the lower end of the trapping mass range, so that, when ions are ejected, this ion will suffer solely its own space charge effect. In such way, best mass accuracy can be achieved.

The chemical shift in the mass spectra is a complex problem and needs further study to identify its causes. A study performed by M. Wells and G. Cooks and published in Analytical Chemistry vol. 72 No. 13, 2667, provided an explanation of the phenomenon. They suggested that differences in cross section between ions will influence their ejection time, if the procedure of the ejection is not performed rapidly. The shift of one compound may derive from an earlier ejection, resulting in a negative mass shift during forward mass scan, or positive mass shift during reverse scan.

A smaller collision cross section normally leads to an earlier ejection, resulting in a negative mass shift during forward mass scan, or positive mass shift during a reverse scan. A larger collision cross section on the other hand, leads to relatively delayed ejection, resulting in a positive mass shift during a forward mass scan, or negative mass shift during a reverse scan. Fragile ions may also fragment in the course of ejection due to collision with buffer gas and this also results in advanced ion signal, if the fragment ions are not in the stability region of a-q diagram. This then causes a peak shift or peak split in the spectrum. In conclusion, as the ion trap is not a pure vacuum device, the measured mass may include an error depending on the chemical structure of the sample ions.

Because the chemical shifts of a compound for a forward mass scan and a reverse scan are in opposite directions, by combining the information obtained from two mass scans in opposite directions it is possible to identify such a chemical shift due to the structural properties of the ion and minimise such error in the mass measurement.

Stafford and collaborators used an alternative way to minimize this phenomenon and to enhance the performances of the ion trap. Technically, this was achieved by altering the distance between the end cap electrodes of the ion trap (stretched ion trap) or by decreasing the angle of the cone asymptotes present in a hyperboloid geometry. These permanent structural changes to the analyzer geometry create a non-linear resonance of ion motion, (these traps are also called non-linear ion traps). However, while the non-linear resonance which is caused by the high order multipole components improves the performances of the instrument, such as good mass resolution at fast forward mass scan, it also introduces some limitations. One of the long existing problems is that such geometry does not maintain a good mass resolution for a reverse mass scan and for precursor isolation.

In Patent Application No. PCT/GB02/04807, Ding and Sudakov disclosed a new ion trap structure which does not include the permanent high order multipole field. With such a trap, high resolution precursor isolation can be achieved by ejecting unwanted ions in the forward and reverse directions with respect to the mass to charge ratio. However the ejection of ions in the reverse direction of mass to charge ratio has not been exploited to achieve the high resolution and high accuracy mass spectrum.

It is object of this invention to use a range-defined reverse mass scan to obtain good mass resolution and good mass accuracy of mass spectrum, without the sacrificing other performances of the ion trap mass spectrometer.

It is also an object of this invention to use the application of forward and reverse mass scan for identification of the chemical shift. This could also be exploited in order to increase the mass accuracy.

According to one aspect of this invention, there is provided a method for obtaining high accuracy mass spectra using an ion trap mass analyser, including the steps of: adjusting operating parameters of the ion trap mass analyser to enable a reverse mass scan where a mass selective resonance ejection of ions is in decreasing order of mass-to charge ratio, setting the trapping field to trap ions in a range of mass-to-charge ratio which has a lower limit close to the mass-to-charge ratio of an ion of interest for which a high accuracy measurement is required, varying the trapping or excitation fields to eject ions during said reverse mass scan, and detecting the ejected ions to obtain a reverse mass scan spectrum.

According to another aspect of this invention, there is provided a method for determining and/or reducing chemical shift involved in mass analysis using an ion trap mass analyser operating in a mass selective instability mode including: adjusting operating parameters of the ion trap mass analyser to enable a forward mass scan and a reverse mass scan to obtain mass spectra of comparable quality, calibrating the ion trap mass analyzer for both forward and reverse mass scans using known calibration agents, alternately recording the mass spectra obtained for a sample using the forward and reverse mass scans, keeping buffer gas pressure constant during the scans and, calculating a difference and/or a mean value of mass peak positions for scans obtained in opposite scan directions to respectively determine and/or reduce said chemical shift.

Figure 2:
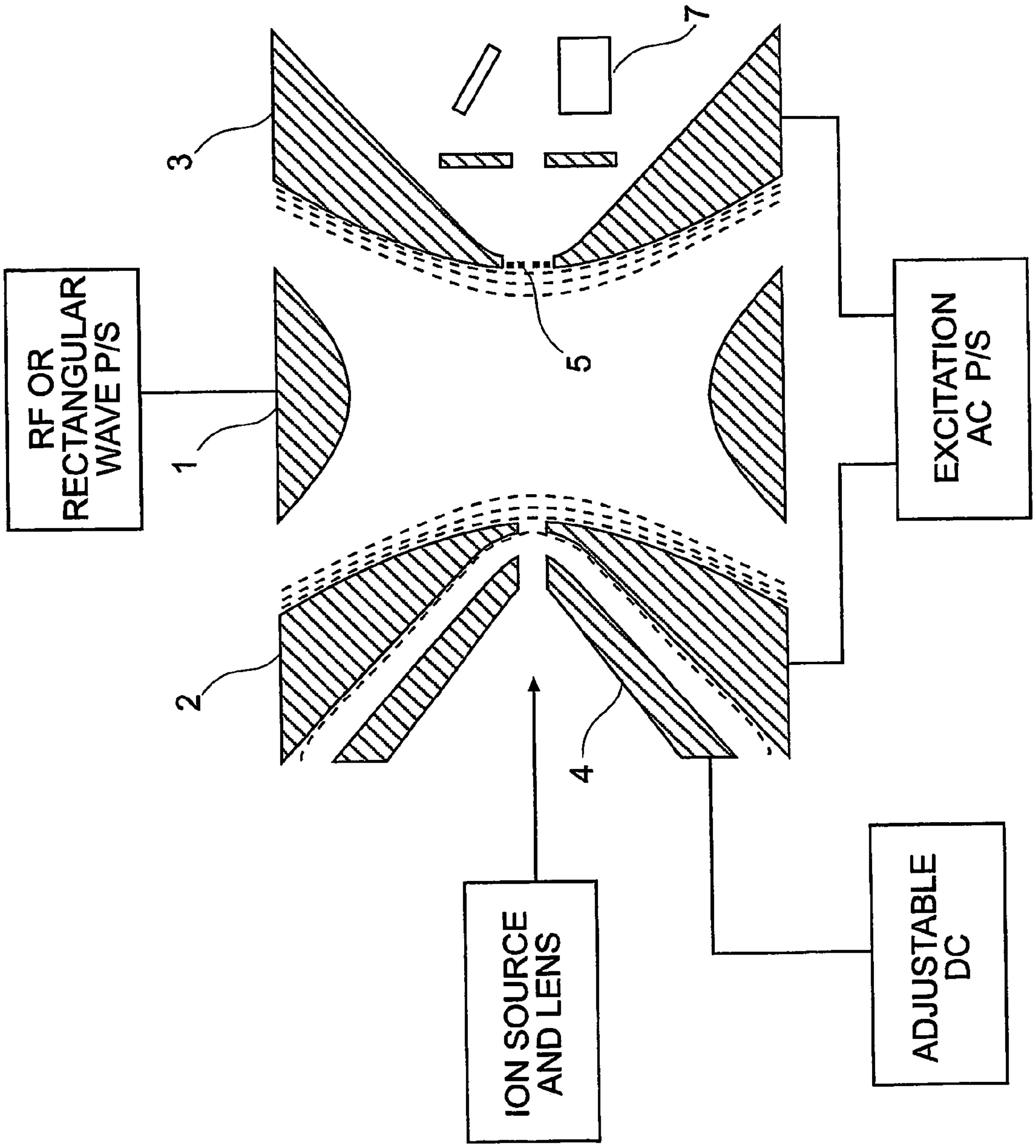
Figure 3:
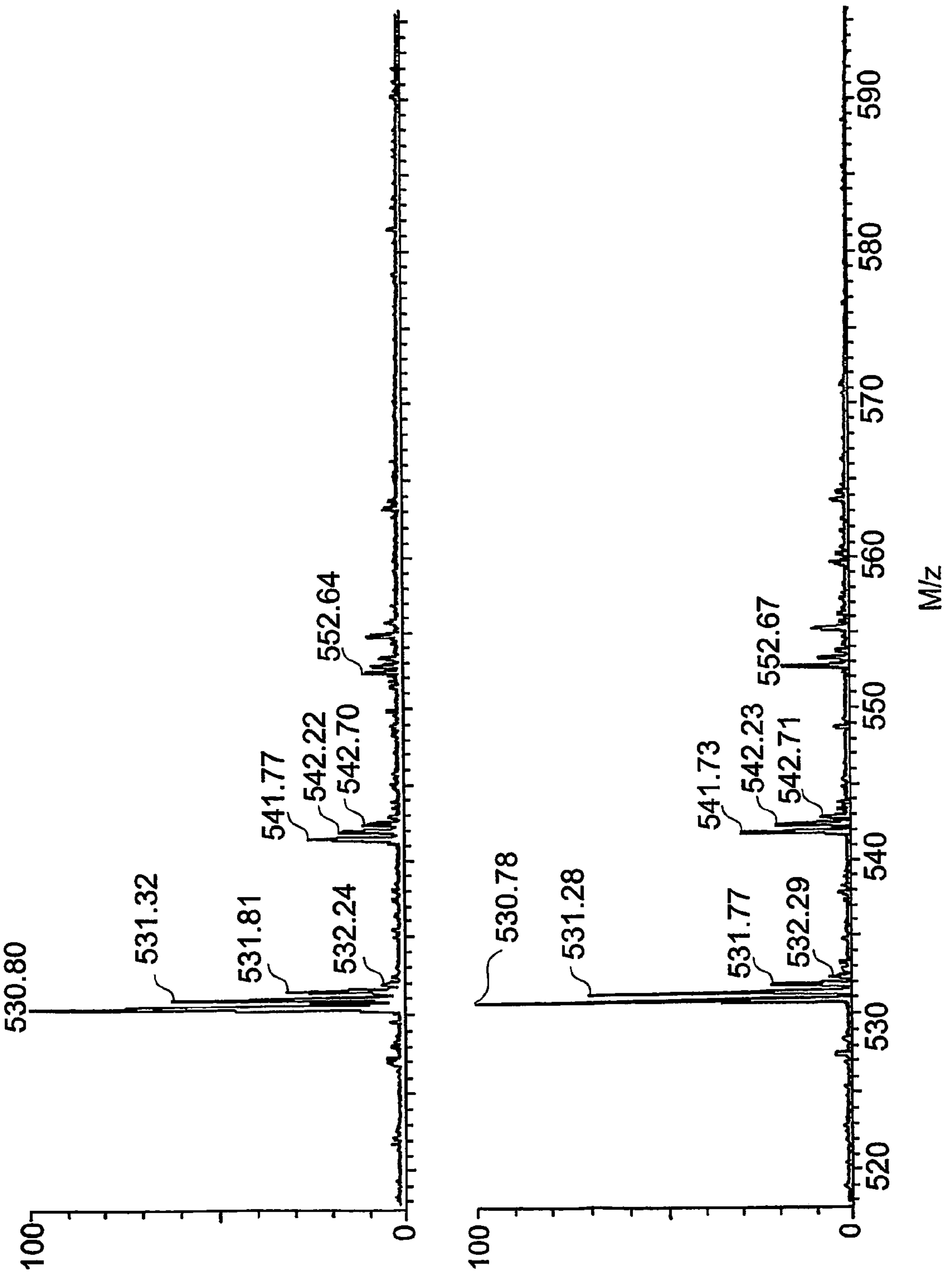
Figure 4:
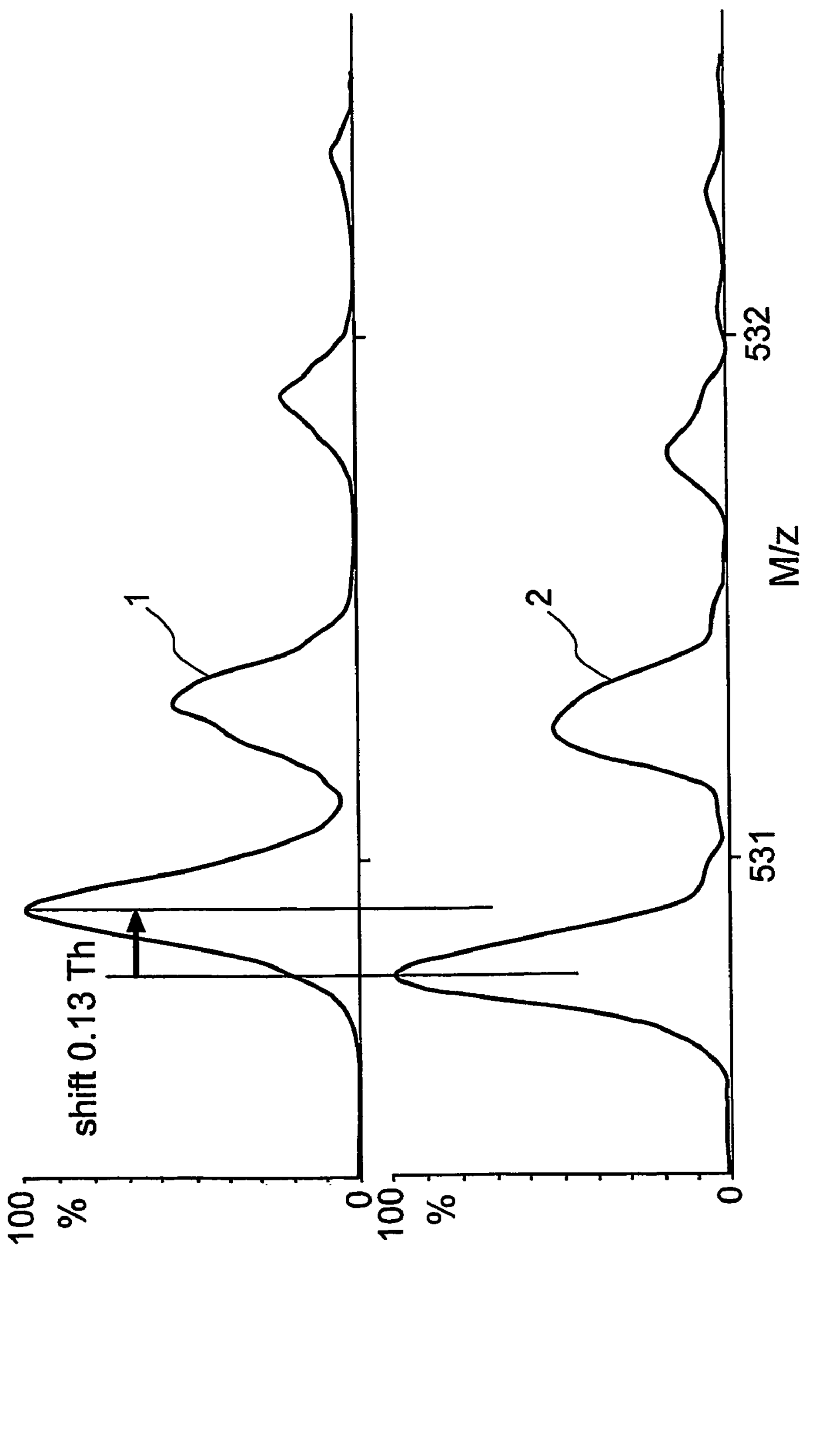
Figure 5:
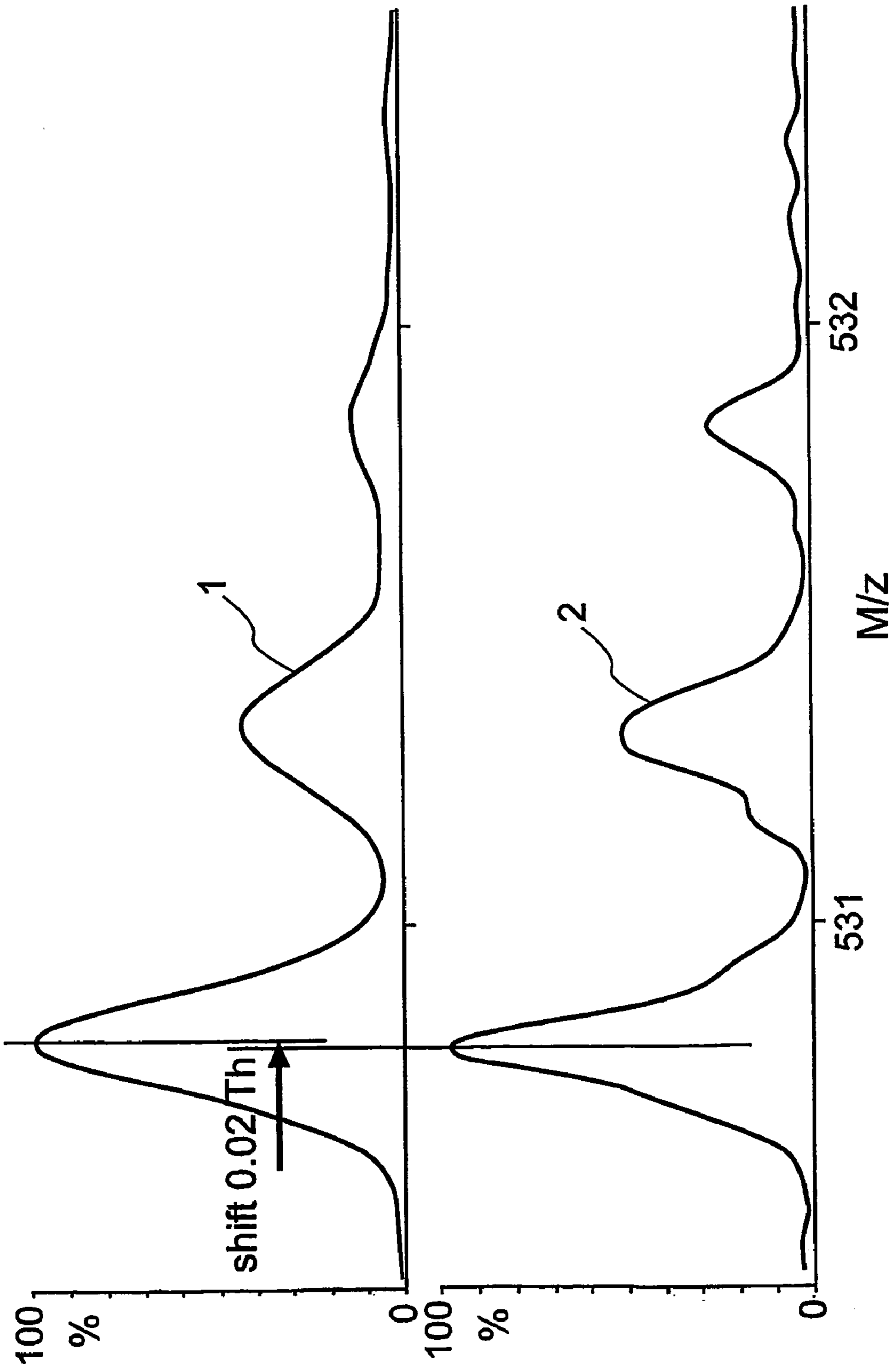
Figure 6:
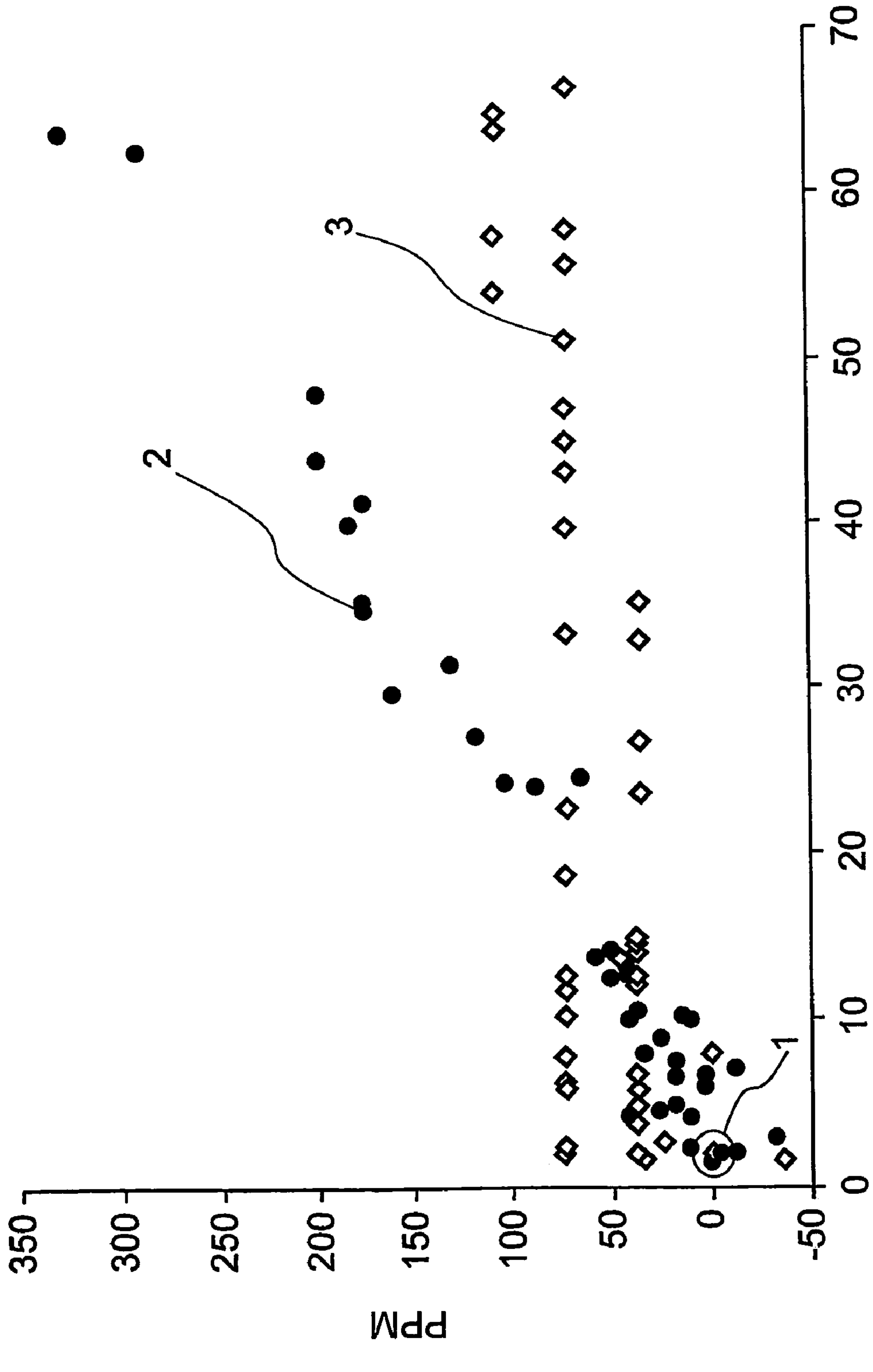
Figure 7:
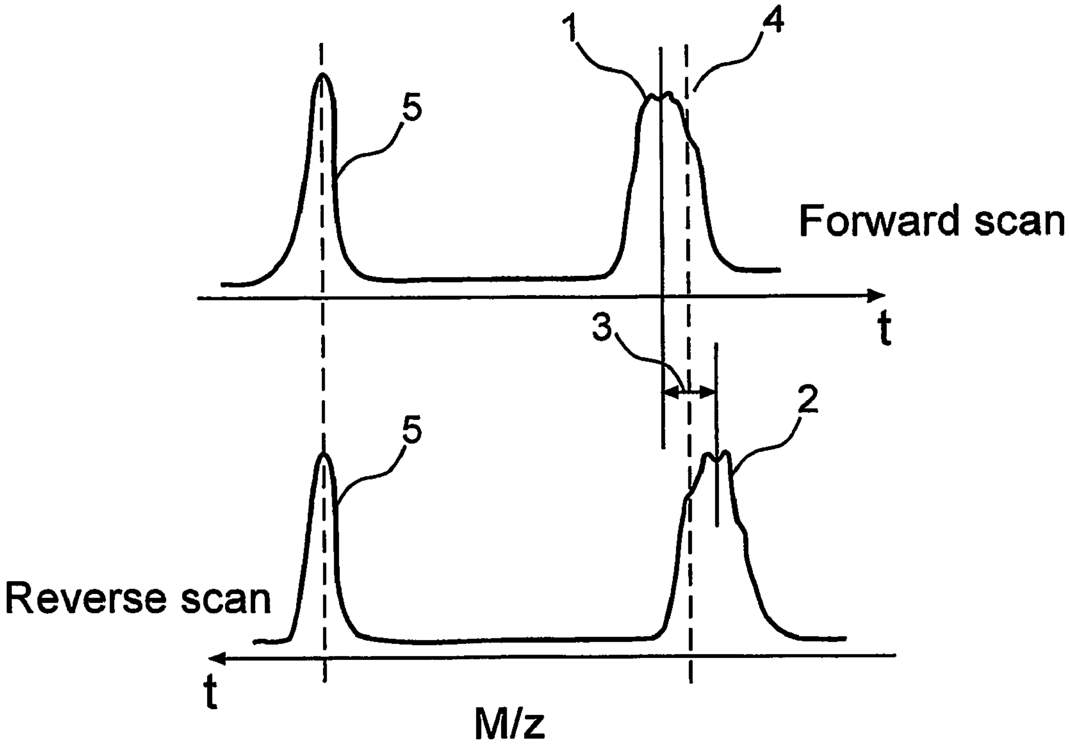
Figure 8:
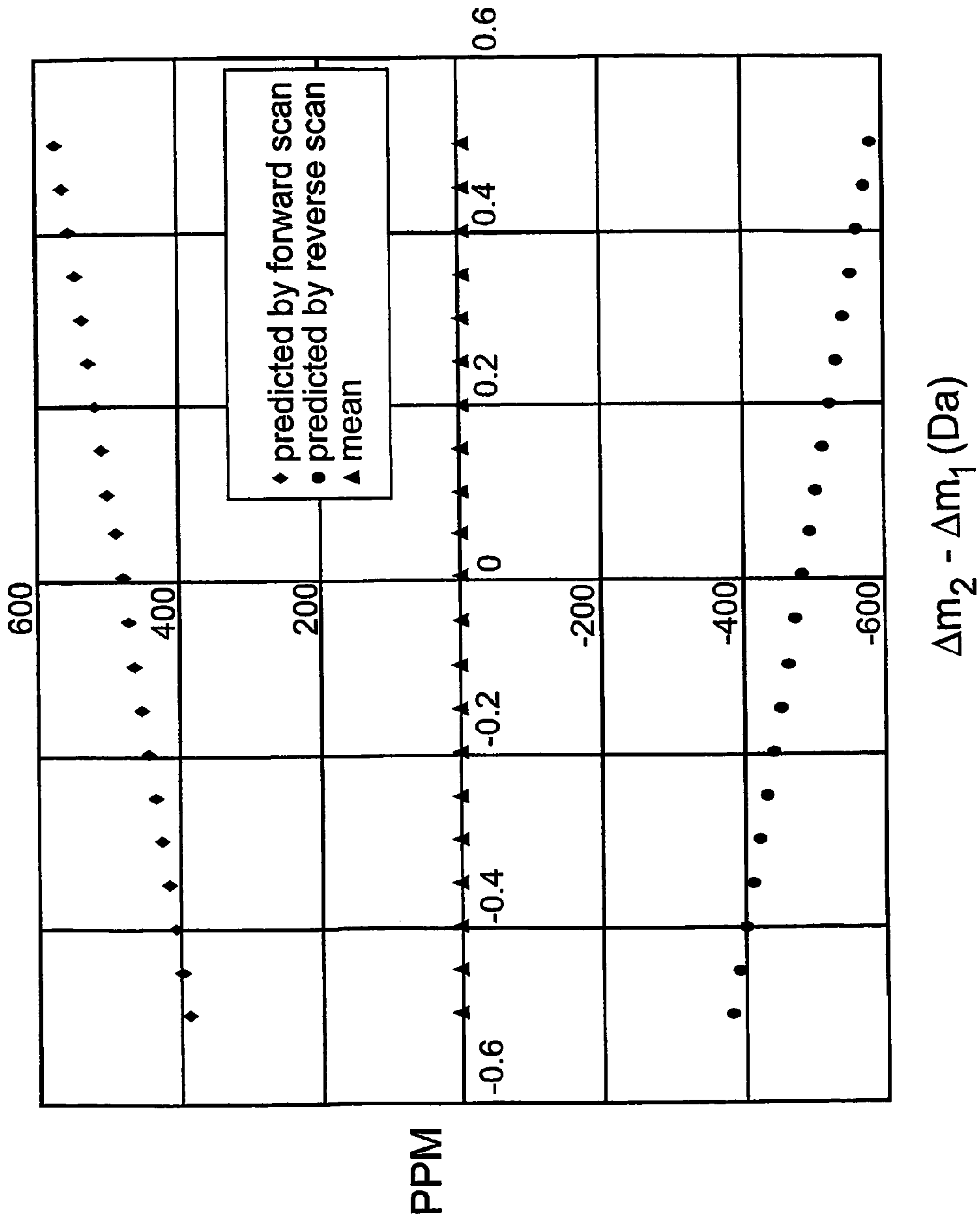

Embodiments of the invention are now described, by way of example only, with reference to the accompanying drawings of which:

FIG. 1 shows the stability (a-q) diagram for an ion trap mass analyzer,

FIG. 2 is a schematic diagram showing an ion trap mass analyzer used in an embodiment of the invention, FIGS. 3(*a*) and 3(*b*) shows mass spectra obtained using the ion trap mass analyzer of FIG. 2 in the forward and reverse mass scan directions respectively, FIG. 4 shows peak shifts obtained by a forward mass scan using different accumulation times for a monoisotopic ion, FIG. 5 shows peak shifts obtained by a reverse mass scan using different accumulation times for a monoisotopic ion, FIG. 6 is a plot showing a relationship between mass shift of doubly charged ions of Bradykinin with abundance, FIG. 7 illustrates a method for identifying chemical shift, and FIG. 8 shows a comparison of mass prediction errors obtained using different calibration methods.

Referring to the stability diagram of FIG. 1, ions in a limited mass range, referenced 1 can be trapped and stored in the ion trap mass analyser. This mass range can be located in a region between resonance point 2 and stability boundary 3. Initially, there might also be some high mass ions trapped with a working point between the origin of q, axis and point 2. If their density is not negligible, they should be removed prior to carrying out a reverse mass scan. This can be done by a number of means disclosed in the prior art; for example, using wide band dipole excitation or by adding a DC component to the quadrupole field to narrow down the mass range To perform resonance ejection, a dipole excitation signal needs to be applied across the end cap electrodes. This signal can either be an analogue supplementary AC signal or a digital signal as disclosed in the international patent publication No. WO 0129875. During the resonance ejection, the secular frequency of an ion, corresponding to a specific mass to charge ratio (m/z) value, approaches the frequency of excitation. In FIG. 1 this resonance point is for $\beta_z=0.5$. For a reverse mass scan the ion's $q_z$ parameter approaches resonance point 2 from the right hand side, and the secular frequency of each ion decreases to match the resonance.

With a stretched ion trap or any ion trap that contains permanent positive high order multipole field in the axial direction, a reverse mass scan will suffer a delay in ejection and impaired mass resolution is expected. This can be explained in that the secular frequency shifts in a direction opposite to that of the scan when positive high order field exists.

The stretched or other permanent modified geometry was originally introduced to improve the performance of forward mass scanning which then suffered a delay of ejection due to the negative high order field caused by the end cap holes. An alternative and more flexible method to overcome the hole effect was disclosed in PCT/GB02/04807 where a field adjusting electrode located outside of trapping region was used to correct the distortion caused by the entrance hole. This type of ion trap Mass analyser can be useful to implement the current invention.

As shown in FIG. 2, the ion trap mass analyser has a ring electrode 1, and end cap electrodes 2, 3, one of these being for ion exit and having a hole covered by a fine mesh 5. A field adjusting electrode 4 behind the entrance aperture of end cap electrode 2 is used to modify field distortions around the entrance aperture. When a positive voltage is applied to the field adjusting electrode 4, the field distortion during the negative phase of the trapping voltage (ions with a relatively large value of the $q_z$ parameter move to the vicinity of end cap hole at negative phase), can be reduced, or compensated. For example, when the ion trap is driven by ±500V square wave voltage, a positive 520V on the field adjusting electrode 4 may keep fluctuations of the secular frequency to a minimum during the course of resonance ejection. With such an ion trap structure and fringing field control, the main trapping field is effectively a pure quadrupole field and distortions caused by the presence of the hole are compensated for, so good resolution of spectra can be obtained using either forward or reverse mass scans. When applying a higher voltage to the field-adjusting electrode 4, an up-shift of secular frequency will be induced during the resonance ejection. This may be suitable to a faster forward mass scan. On the other hand, a lower positive voltage on the field adjusting electrode may be suitable to a faster reverse scan.

FIGS. 3(*a*) and 3(*b*) show examples of spectra obtained using the above-described ion trap mass analyser. The ion trap mass analyser is driven digitally, where the trapping voltage is a ±500V rectangular wave voltage and the dipole excitation is a 1V pulse repeating every $4^{th}$ cycle of the main rectangular wave. The doubly charged Bradykinin ion was generated by an electrospray ion source and introduced into the ion trap through transfer optics. FIG. 3(*a*) is a spectrum obtained using a forward mass scan and FIG. 3(*b*) obtained using a reverse mass scan. Both spectra were obtained under the same ion accumulation conditions, the same scan speeds (800 Th/s) and same field adjusting voltage. The spectra of FIG. 3(*a*) and FIG. 3(*b*) both display good mass resolution (R>3000).

When ion accumulation time increases, space charge effects occur. Two main effects due to the increase of space charge can be theoretically predicted.

1) The profile of the trapping potential becomes shallower and the modification of the pseudopotential well provokes reduction of the frequency of ion secular motion, so mass displacements are generally towards the high mass side.

2) The Coulomb force between ions of adjacent mass to charge ratios tends to synchronise the vibrations. As a result, the peak of a smaller mass shifts up and the peak of a larger mass shifts down, until they eventually merge together.

For the monoisotopic ion obtained by forward mass scan, effect 2 above works in the same direction so that a large mass shift is observed. This is clearly demonstrated by FIG. 4, where spectrum 1 used 25 ms ion accumulation time and spectrum 2 used 0.8 ms ion accumulation time. A 0.13 Th mass shift is recorded. Since in reverse scan the adjacent isotopic ions ($^{13}C$, $^{13}C_2$ . . . ) have been already ejected, the monoisotopic ion ($^{12}C$ only) will no longer suffer from their presence during resonance ejection. Only effect 1 above may remain but this is minimised when the monoisotopic ion is the last ion species to be ejected from the trap. Even for the heavier isotopic peaks, say $^{13}C$, the mass shift due to the space charge is also reduced because the two effects work in opposite directions. While the first effect always shifts the peak positively, the second effect which is for $^{13}C$ shifts towards $^{12}C$, producing a negative shift. This is clearly demonstrated by FIG. 5, which shows two reverse scan spectra, 1 for 25 ms and 2 for 0.6 ms ion accumulation times respectively. The mass shift for this monoisotopic peak is only 0.02 Th.

FIG. 6 shows a plot which indicates the relationship existing between mass shift (in terms of ppm) of the doubly charged ion of Bradykinin with its abundance expressed in Volts. As can be seen in the plot, differences in mass displacement are not only attributable to the ion intensity (space charge effect) but also to the scan direction used in the mass spectrometric analysis. Spectra obtained under both directions were calibrated at point 1 of a low ion density. The round dots 2, for the forward scan spectra show an expected increment of mass shift when ion abundance increases. The diamond dots 3, for the reverse mass scan spectra show the limited effect of the increase in ion abundance on mass displacement. The results indicate that the reverse mass scan offers higher mass accuracy.

A reverse mass scan normally covers a narrower mass range compared to that of a forward mass scan. Therefore, a high accuracy reverse scan experiment may be used after a wider mass range forward scan. The reverse scan may be used as a zoom scan where high resolution and high tolerance to the space charge effect on accuracy is required.

As has been discussed, high resolution mass scanning requires minimum frequency shift during the ejection process (where the amplitude of the secular motion increases), or a frequency shift towards resonance (rather than shift away from resonance). With an ion trap mass analyser having a fringing field adjusting electrode, it is possible either to select a common DC voltage applied to the electrode for both the forward and reverse mass scans (as illustrated in above experiments), or choose different DC voltages to favour each scan direction. In the later case, prior to a reverse scan the field adjusting voltage should be set to a lower positive (in the positive ion mode) value compared to the value that suits the forward full scan.

By setting the field adjusting voltage at a point such that the secular frequency does not shift into resonance (it may shift away from resonance or not shift at all), the ejection procedure may be deliberately prolonged to promote a chemical shift. A chemical shift of one compound may feature an earlier ejection, which would be negative mass shift for a forward mass scan, or a positive mass shift for a reverse scan. A chemical shift of another compound may feature a delay of ejection, which would be positive mass shift for a forward mass scan, or a negative mass shift for a reverse scan. In either case, the difference of peak position in two opposite mass scans gives a clear indication of the chemical shift. For a structural fragile species, a better prediction of accurate mass of the species may be derived using averaged mass values obtained from forward and reverse mass scans.

FIG. 7 demonstrates the method proposed to identify the chemical shift. For both forward and reverse mass scans, a known standard molecule which generates stable, robust ions species is used to calibrate the spectra. This calibration standard is shown in FIG. 7 as peak 5, although the calibration may not be necessarily internal. The fragile sample ion may be ejected earlier than it should be, marked with line 4, due to collision induced fragmentation. The peak of this ion obtained using a forward mass scan, shown as 1, shifts to lower mass, whereas the peak of the same ion obtained using a reverse mass scan, shown as 2, shifts to higher mass. The difference 3 can therefore be calculated using data processing.

FIG. 8 shows a comparison of mass prediction errors obtained using different calibration methods. In the figure the mass of the sample is assumed to 520 Da, and the mass of the calibrants to be 500 Da and 550 Da. The chemical shift of the sample relative to the calibration standards is up to 0.5 Th.

When the forward and the reverse mass scans use the same working conditions, such as the scan speed and the buffer gas pressure, the absolute values of corresponding chemical shifts are likely to be the same. Therefore, the mean value of the peak positions obtained by the forward and reverse mass scans can be used to determine the true mass-to-charge ratio of the ion without the effect of chemical shift.

By understanding the above principle, we now further propose a calibration procedure for removing the chemical shift and achieving high mass accuracy. It is assumed that two calibration standards (molecules having known mass to charge ratios) $m_1$, $m_2$ are used to determine an unknown mass to charge ratio m of a sample. The sample and the calibrants may have different absolute mass shifts due to their different structures. So in a forward scan spectrum, each peak would display their mass at $y_1$, $y_2$ and y respectively, where $$y_1=m_1+\Delta m_1$$

$$y_2=m_2+\Delta m_2$$

and $$y=m+\Delta m$$

We can call $\Delta m_1, \Delta m_2, \Delta m$ the absolute chemical shifts of the respective peaks. Because we know masses $m_1$ and $m_2$, by linear extrapolation the predicted mass for the sample using forward mass scan can be expressed as $$
\begin{aligned}
m_{fp} &= \frac{y - y_1}{y_2 - y_1}(m_2 - m_1) + m_1 \\
&= \frac{m_2 - m_1}{m_2 - m_1 + \Delta m_2 - \Delta m_1}(m - m_1 + \Delta m - \Delta m_1) + m_1
\end{aligned}
\tag{1}
$$

If the ejection advance or delay for forward scan and reverse scan are made the same (by controlling the scan speed and gas pressure so that they are the same), the mass shifts for the three species in the reverse scan spectrum should have the same absolute values as in the forward scan, but with opposite signs, i.e, $-\Delta m_1, -\Delta m_2, -\Delta m$. So the predicted mass using reverse scan spectrum would be $$
\begin{aligned}
m_{rp} &= \frac{y - y_1}{y_2 - y_1}(m_2 - m_1) + m_1 \\
&= \frac{m_2 - m_1}{m_2 - m_1 - \Delta m_2 + \Delta m_1}(m - m_1 - \Delta m + \Delta m_1) + m_1
\end{aligned}
\tag{2}
$$

Using equations (1) and (2), we can compare the mass accuracy for prediction of mass by using $m_{fp}$, $m_{rp}$ or using the mean value of $(m_{fp}+m_{rp})/2$.

It can be seen that theoretically the mean value will be an accurate value of absolute mass (i.e. complete removal of chemical shift) if $\Delta m_1 = \Delta m_2$. This is possible if the two selected standards are robust in structure and have similar collision cross sections with buffer gas. However, even if this condition is not satisfied, the mean value is still much more accurate than those predicted using one direction scan. In FIG. 8, mass accuracy for three kinds of prediction against the difference in $\Delta m_1$ and $\Delta m_2$ are plotted. The mean value gives an error less than 6 ppm, while the prediction errors obtained using single direction scans are about 600 ppm. It can therefore be seen that by using both forward and reverse scans one can obtain much more accurate mass measurements. At the same time the difference in chemical structure can also be identified by subtracting the value of $m_{fp}$ from $m_{rp}$.

The invention claimed is:

1. A method for obtaining high accuracy mass spectra using an ion trap mass analyser, including the steps of:

adjusting operating parameters of the ion trap mass analyser to enable a reverse mass scan where a mass selective resonance ejection of ions is in decreasing order of mass-to-charge ratio, setting the trapping field to trap ions in a range of mass-to-charge ratio which has a lower limit close to the mass-to-charge ratio of an ion of interest for which a high accuracy measurement is required, varying the trapping or excitation fields to eject ions during said reverse mass scan and detecting the ejected ions to obtain a reverse mass scan spectrum.

2. A method as claimed in claim 1 wherein the ion trap mass analyser is a 3D quadrupole ion trap comprising a ring electrode and two end cap electrodes wherein one of said end cap electrodes has an entrance aperture and a field adjusting electrode is located outside the trapping region adjacent to the said entrance aperture.

3. A method as claimed in claim 2 wherein the step of adjusting said parameters includes setting a DC voltage on the field adjusting electrode at such a level as to minimize the secular frequency shift or to cause a down shift of the secular frequency during resonant ejection of ions.

4. A method as claimed in claim 1 including adjusting the mass-to-charge ratio range of trapped ions by ejecting unwanted ions using a resonance ejection method, or by placing unwanted ions in the instability region, before the reverse mass scan is carried out.

5. A method as claimed in claim 1 wherein the said mass-to-charge ratio range is adjusted so that the mass to charge ratio of the monoisotopic peak of a species to be accurately measured is the lowest in the range.

6. A method as claimed in claim 1 wherein said reverse scan or said ejection of ions is a process carried out in a small range of mass-to-charge ratio compared to that of a conventional full scan.

7. A method as claimed in claim 1 wherein the reverse scan is a zoom scan.

8. A method as claimed in claim 1 wherein said step of adjusting is carried out before said step of setting.

9. A method as claimed in claim 1 wherein said step of setting is carried out before said step of adjusting.

10. A method for determining and/or reducing chemical shift involved in mass analysis using an ion trap mass analyser operating in a mass selective instability mode including:

adjusting operating parameters of the ion trap mass analyser to enable a forward mass scan and a reverse mass scan to obtain mass spectra of comparable quality, calibrating the ion trap mass analyser for both forward and reverse mass scans using known calibration agents, alternately recording the mass spectra obtained for a sample using the forward and reverse mass scans, keeping buffer gas pressure constant during the scans and, calculating a difference and/or a mean value of, mass peak positions for spectra obtained in opposite scan directions to respectively determine and/or reduce said chemical shift.

11. A method as claimed in claim 10 wherein the ion trap mass analyser is a 3D quadrupole ion trap comprising a ring electrode and two end cap electrodes wherein one of said end cap electrodes has an entrance aperture and a field adjusting electrode is located outside the trapping region adjacent to the said entrance aperture.

12. A method as claimed in claim 11 wherein the adjustment of said parameters includes setting a DC voltage on the field adjusting electrode at one level for a forward mass scan and at another level for a reverse mass scan and ensuring that both scans obtain comparable mass resolution at the same scan speed.

13. A method as claimed in claim 11 wherein the adjustment of said parameters includes setting a DC voltage on the field adjusting electrode at one level for each mass scan to cause delayed ejection promoting a notable chemical shift.

14. A method as claimed in claim 10 including reducing the mass range of trapped ions by ejecting unwanted ions using a resonance ejection method, or by placing unwanted ions in the instability region, before said forward or reverse mass scans are carried out.

15. A method as claimed in claim 10 including controlling the density of trapped ions to avoid mass shift caused by space charge effects.

16. A method as claimed in claim 10, wherein said known calibration agents comprises at least two calibration ions that do not undergo fragmentation under mass scan conditions, said at least two calibration ions having different masses and the same charge state.

* * * * *